United States Patent
Berger et al.

(10) Patent No.: US 11,118,537 B2
(45) Date of Patent: Sep. 14, 2021

(54) FUEL INJECTOR

(71) Applicant: Woodward L'Orange GmbH, Stuttgart (DE)

(72) Inventors: Ingmar Joachim Berger, Stuttgart (DE); Enrico Barow, Stuttgart (DE); Hans-Joachim Koch, Glatten (DE); Michael Nitsche, Schwieberdingen (DE)

(73) Assignee: Woodward L'Orange GmbH, Stuttgart (DE)

( * ) Notice: Subject to any disclaimer, the term of this patent is extended or adjusted under 35 U.S.C. 154(b) by 0 days.

(21) Appl. No.: 16/620,313

(22) PCT Filed: Jun. 6, 2018

(86) PCT No.: PCT/EP2018/000294
§ 371 (c)(1),
(2) Date: Dec. 6, 2019

(87) PCT Pub. No.: WO2018/224181
PCT Pub. Date: Dec. 13, 2018

(65) Prior Publication Data
US 2021/0079874 A1    Mar. 18, 2021

(30) Foreign Application Priority Data

Jun. 8, 2017   (DE) .................. 102017005478.9

(51) Int. Cl.
*F02M 21/02*   (2006.01)
*F02B 19/02*   (2006.01)
(Continued)

(52) U.S. Cl.
CPC ......... *F02M 21/0275* (2013.01); *B33Y 80/00* (2014.12); *F02B 19/02* (2013.01); *F02B 19/1004* (2013.01); *F02M 21/0296* (2013.01)

(58) Field of Classification Search
CPC ............ F02M 21/0275; F02M 21/0296; F02B 19/10; F02B 19/1004; F02B 19/02; B33Y 80/00
(Continued)

(56) References Cited

U.S. PATENT DOCUMENTS

| 5,222,993 A * | 6/1993 | Crane ................ F02M 21/0272 |
| | | 123/256 |
| 2003/0056749 A1* | 3/2003 | Beckertgis .............. F02B 19/02 |
| | | 123/292 |

(Continued)

FOREIGN PATENT DOCUMENTS

| CN | 101457687 | 6/2009 |
| CN | 103422970 | 12/2013 |

(Continued)

OTHER PUBLICATIONS

International Search Report and Written Opinion in International Application No. PCT/EP2018/000294, dated Aug. 13, 2018, 19 pages with English translation.
(Continued)

*Primary Examiner* — Mahmoud Gimie
(74) *Attorney, Agent, or Firm* — Fish & Richardson P.C.

(57) ABSTRACT

The invention relates to a fuel injector (1), comprising: a pre-chamber (17) within the injector, a high-pressure injector part (3) for discharging combustible gas, which high-pressure injector part has a nozzle unit (5) and a reciprocating nozzle valve element (7), a nozzle-side end section of which is accommodated in a high-pressure chamber (11) of the high-pressure injector part (3), a pre-chamber assembly (39), within the framework of which the high-pressure chamber (11) of the high-pressure injector part (3) is separated over a nozzle-side end section, the high-pressure chamber being surrounded by the pre-chamber (17).

20 Claims, 2 Drawing Sheets

(51) Int. Cl.
*B33Y 80/00* (2015.01)
*F02B 19/10* (2006.01)

(58) Field of Classification Search
USPC .......................................................... 123/261
See application file for complete search history.

(56) References Cited

U.S. PATENT DOCUMENTS

| | | | | |
|---|---|---|---|---|
| 2009/0159031 | A1* | 6/2009 | Gruber | F02M 57/06 |
| | | | | 123/143 B |
| 2014/0083391 | A1* | 3/2014 | Gruber | F02B 19/12 |
| | | | | 123/260 |
| 2015/0204276 | A1* | 7/2015 | Jaegle | F02M 45/12 |
| | | | | 123/294 |
| 2016/0348571 | A1* | 12/2016 | Huang | F02B 23/101 |
| 2017/0167357 | A1* | 6/2017 | Maier | F02F 1/40 |

FOREIGN PATENT DOCUMENTS

| | | |
|---|---|---|
| CN | 103670850 | 3/2014 |
| CN | 105041453 | 11/2015 |
| DE | 19622945 | 12/1997 |
| DE | 102013014070 | 3/2014 |
| DE | 102014103763 | 10/2014 |

OTHER PUBLICATIONS

International Preliminary Report on Patentability in International Application No. PCT/EP2018/000294, dated Dec. 10, 2019, 7 pages.
Chinese Office Action in CN Appln. No. 201880038189, dated Jan. 5, 2021, 14 pages with English Translation.

* cited by examiner

FUEL INJECTOR

The present disclosure relates to a fuel injector.

A motor concept can be implemented with the combination of a pre-chamber, in particular a flushed pre-chamber, and a high pressure combustion gas injector, which can be operated with just one fuel in the form of a combustion gas with low combustion gas slippage and a high specific power output (similar to that with diesel). The ignition is obtained by means of the pre-chamber (pilot), upon which the pressurized combustion gas is injected into the combustion chamber heated by the pilot combustion, wherein it can combust with a diffusion combustion. Due to the normally narrower structural space conditions, there are certain problems that can be expected with placing the pre-chamber assembly next to the high pressure injector part on the fuel injector in a space saving manner, while keeping the production costs low.

Based on this, the fundamental object is to create a fuel injector of the type specified above that can be easily produced in a space saving manner with respect to the production effort and accommodating the pre-chamber assembly.

This object is achieved by a fuel injector.

A fuel injector is proposed for an internal combustion engine, in particular for a large engine. The fuel injector is intended in particular for use with combustion gas, preferably in the form of natural gas, or in the form of a special gas, landfill gas, biogas, or some other form of combustion gas. The fuel injector can be preferably used with a gas engine in this regard, in particular an externally ignited gas engine. In general, an internal combustion engine that has the fuel injector can be a motor in a motor vehicle, a train, or a utility or special use vehicle, preferably, e.g., a seafaring vehicle such as a ship, or a stationary facility, e.g., a thermal power station, an (emergency) power unit, e.g. for industrial applications, in general for both on-shore and off-shore applications. The fuel injector is preferably intended exclusively for use with combustion gas.

The proposed fuel injector has a pre-chamber inside the injector, which is preferably a "flushed" pre-chamber, which differs from the so-called "un-flushed" pre-chamber. A flushed pre-chamber of this type is configured to be supplied, or coated, with fuel, i.e. in particular with combustion gas in the present case, thus "(combustion gas) flushed," i.e. for a subsequent ignition (of the combustion gas mixture formed thereby) in the pre-chamber. An introduction of combustion gas into the pre-chamber (flushing) preferably takes place at low pressure, e.g. at a pressure of 5 to 10 bar. The fuel injector has, e.g., a valve device for supplying the combustion gas to the flushed pre-chamber.

A pilot light can be generated via the ignition in the pre-chamber in the framework of a combustion procedure that can take place with the fuel injector, which can then pass into the main combustion chamber—preferably via passages in the pre-chamber. Once it passes into the main combustion chamber, the mixture ignition can than take place therein, wherein the mixture is primarily formed with highly pressurized combustion gas serving as the main combustion gas, and wherein the highly pressurized combustion gas can also be discharged via the fuel injector.

In order to discharge the highly pressurized combustion gas, the fuel injector has a high pressure injector part, wherein the combustion gas is discharged at a pressure of greater than 300 bar or even 350 bar. The high pressure injector part comprises a nozzle assembly for discharging the combustion gas, formed, e.g., by one or more nozzle openings and an (axial) stroke-displaceable nozzle valve element. The nozzle valve element can have one or more parts, in particular in the form of a rod, wherein it acts in particular as a nozzle needle in the framework of the present disclosure, and/or is created as such.

The fuel injector can have a hydraulic control circuit for the (stroke) control of the nozzle valve element, formed, e.g. by a pilot valve and a dedicated actuator insofar as an indirect control or a direct control of the nozzle valve element is intended.

The nozzle valve element is accommodated according to an example at a nozzle-side (facing the nozzle assembly) end section in a high pressure chamber of the high pressure injector part. The high pressure chamber is thus a nozzle chamber into which highly pressurized combustion gas can be introduced, and from which the highly pressurized combustion gas can flow out, depending on the discharge setting of the nozzle valve element on the nozzle assembly. In an advantageous, space-saving embodiment of the fuel injector, the high pressure chamber is in the shape of a tube. There can be a gap between the surrounding wall and the nozzle valve element, in particular an annular gap, which can extend around the end section of the nozzle valve element, or toward the end of the fuel injector away from the nozzle, serving as a combustion gas reservoir, or high pressure chamber.

The proposed fuel injector also has a pre-chamber assembly, within which, or in which the high pressure chamber of the high pressure injector part is separated at the circumference from the pre-chamber by a nozzle-side end section (of the high pressure chamber), in particular by means of a separating wall assembly. In this case, the pre-chamber—preferably having an annular cross section—is located radially on the outside (in particular radially outside the separating wall assembly) and the nozzle-side end section of the high pressure chamber lies radially on the inside (in particular radially inside the separating wall assembly), in particular encircled by the separated pre-chamber. With this embodiment of the fuel injector it is possible to accommodate the internal pre-chamber in the injector on the fuel injector in a space-saving manner, and to thus also keep the production effort advantageously low. Other advantageous effects are also achieved, which shall be explained in greater detail below in the framework of advantageous developments of the fuel injector.

According to a preferred embodiment of the fuel injector, the pre-chamber assembly is formed by a pre-chamber element, within which the end section of the high pressure chamber is separated from the pre-chamber at its circumference, i.e. in particular by means of a separating wall assembly. The pre-chamber element can basically take the form of a conventional nozzle, and can be tensioned against the injector housing by means of a tensioning nut for example. Such a pre-chamber element is preferably made of a heat resistant material, such that the external temperatures from the combustion in the pre-chamber can be dealt with.

The pre-chamber assembly can also have a sleeve-shaped element that forms the separating wall assembly, or for separating the nozzle-side end section of the high pressure chamber from the pre-chamber encircling it. The sleeve-shaped or tube-shaped element can advantageously be produced easily and placed in the fuel injector, in particular in a pre-chamber element as explained above. The sleeve-shaped element encircles the nozzle-side end section of the nozzle valve element, and potentially also guides it, also serving as the separating wall between the high pressure chamber and the pre-chamber, or also functioning as a guide.

In general, the sleeve-shaped element is located, e.g., between the nozzle-side end of the fuel injector, or the pre-chamber, and a cover element (in particular on the pre-chamber element), such as a housing element, e.g. an intermediate washer.

With the sleeve-shaped element, it is advantageously possible to select the material for the outer encircling pre-chamber wall, in particular for the pre-chamber element, such that it differs from that of the internal, sleeve-shaped element, by means of which different demands regarding the respective thermal resistance can be easily accommodated, and the costs can be reduced. By way of example, a separating wall assembly formed by means of the sleeve-shaped element can be cooled more effectively due to the internal highly pressurized gas flowing around the nozzle valve element in the high pressure chamber, thus with a lower thermal resistance than the outer wall of the pre-chamber.

It is also advantageously possible with such an embodiment to create a seat (e.g. through grinding) for the nozzle valve element, in particular on the nozzle side of the pre-chamber element, in a simple manner, because access to the seat is ensured as long as the sleeve-shaped element for separating the pre-chamber is not yet placed in or on the pre-chamber (overflow openings for the pre-chamber and/or the nozzle assembly can also be advantageously formed and finished on the pre-chamber element). The final securing of the sleeve-shaped element on the fuel injector or the pre-chamber element can be obtained with a form and/or force fitting attachment, e.g. in the framework of a tensioning (in which case a material bond is advantageously unnecessary).

With embodiments that have a sleeve-shaped element, the separating wall assembly can be a double-walled sleeve, for example, or a second sleeve element can be provided, which encompasses the sleeve-shaped element, in particular ensuring an encompassing gap. With such embodiments, which have a multi-walled separating wall for separating the pre-chamber from the end section of the high pressure chamber, the wall element or sleeve element facing the pre-chamber, preferably in the form of a sheet metal, functions as a heat shield. The heat shield can prevent exposure of the end section of the high pressure chamber to maximum temperatures, because a dampened temperature curve can be obtained with the heat shield, by means of which the load to the components can be significantly reduced. As a result, an improved thermal insulation of the high pressure injector part can be obtained that is extremely easy to produce.

Other preferred embodiments of the fuel injector, which likewise have a pre-chamber element, can also have an integrally formed separating wall (assembly), by means of which the end section of the high pressure chamber is separated circumferentially from the pre-chamber. By way of example, the pre-chamber can be entirely encompassed or encapsulated by the pre-chamber element. With these embodiments it is proposed in particular that the pre-chamber element is produced by means of an additive production process, e.g. a 3D printing process. With this production process, a larger design freedom for the pre-chamber is obtained, e.g. with regard to the cross section of the pre-chamber, the accommodation of turbulators or other inserts, or with regard to the integration of cooling channels. Furthermore, such an embodiment allows for an extremely simple installation, wherein a self-centering can take place, e.g. by means of centering cones on the injector housing and pre-chamber element, or in the framework of tightening it down.

It is also proposed in general in the framework of the present disclosure that the fuel injector have an—in particular internal—ignition device, i.e. for the pre-chamber ignition, e.g. a spark plug or a laser ignition device. In a particularly preferred development, the fuel injector can also be configured to supply the pre-chamber with combustion gas accumulating as leakage gas at the high pressure injector part. Such a supplying, in particular exclusively in the interior of the injector, allows for extremely short lines, wherein there can also be a temporary reservoir for low-pressure combustion gas in the injector, or the possibility of supplying it via an external source.

An internal combustion engine is also proposed in the framework of the present disclosure, which contains at least one of the fuel injectors described above.

Further features and advantages can be derived from the following description of exemplary embodiments, based on the drawings in the figures, which show details. The individual features can be implemented in and of themselves or in various combinations in a variation.

Preferred embodiments of the shall be explained in greater detail below in reference to the attached drawings. Therein:

DESCRIPTION OF DRAWINGS

In the following descriptions and drawings, identical reference symbols correspond to elements that have the same or similar functions.

FIG. 1 shows a fuel injector 1 intended for a combustion gas operation, in particular for discharging highly pressurized combustion gas, which can be supplied to the fuel injector 1, e.g. in the form of natural gas.

Figure 1:
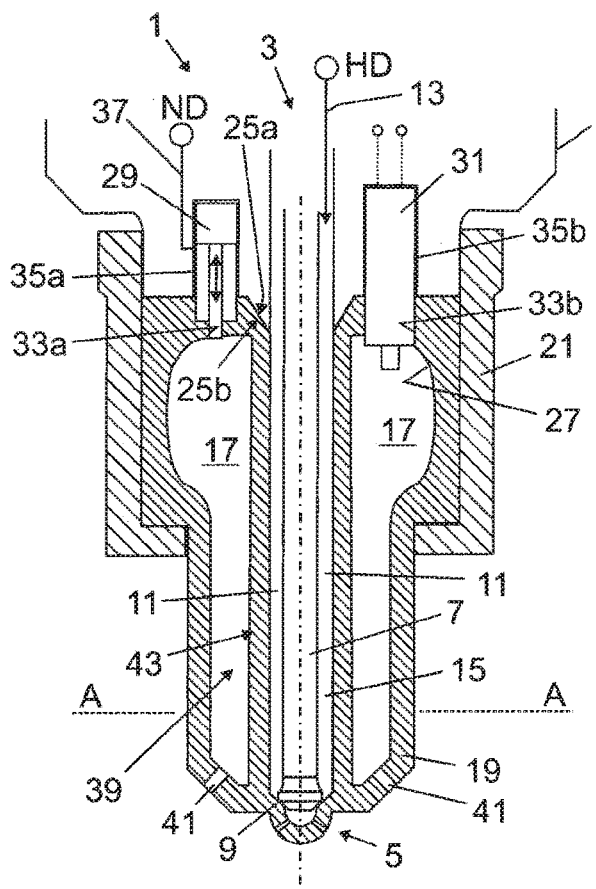
FIG. 1 shows a fuel injector, by way of example and schematically, in a broken down and simplified sectional view according to one possible embodiment.

The fuel injector 1 comprises a high pressure injector part 3 for discharging the combustion gas, which has a nozzle assembly 5 formed by a number of nozzle openings and an (axially) stroke displacing nozzle valve element 7. In order to control the stroke of the nozzle valve assembly 7, the fuel injector 1, or its high pressure injector part 3, has a control circuit, which not illustrated in the figures.

The in particular rod-shaped nozzle valve element 7, presently in the form of a nozzle needle, acts against a nozzle-side (nozzle valve) seat 9 located on the fuel injector 1, i.e. at a nozzle-side end, and is able to selectively open or close a flow path from a high pressure chamber 11 to the nozzle assembly 5 depending on its stroke control setting. The high pressure chamber 11 of the high pressure injector part 3 can be pressurized with highly pressurized combustion gas (thus forming a combustion gas high pressure chamber 11), for which the fuel injector 1 has a high pressure (supply) channel 13 connected thereto. The nozzle valve element 7 is also accommodated with its nozzle-side end section (connected to the seat 9) in the high pressure chamber 11 of the high pressure injector part 3, i.e. over an axial length, wherein an annular gap 15 is formed around the end section, in which the highly pressurized combustion gas can be accommodated for a discharge.

The fuel injector 1 also has a pre-chamber 17 (inside the injector), which is formed in a pre-chamber element 19 of the fuel injector 1, wherein the pre-chamber element 19 also forms a seat 9 for the nozzle valve element 7, cf. FIG. 1, and contains the nozzle assembly 5. The pre-chamber element 19 has more or less the geometry of a conventional nozzle element, in particular a cylindrical, stepped outer contour, and is tensioned against the injector housing 23 at the end away from the nozzle by means of a tensioning nut 21. The pre-chamber element 19 is—advantageously easily—also coaxially oriented and centered with respect to the injector housing 23 via corresponding centering cones 25a, b.

In the embodiment shown in FIG. 1, the pre-chamber element 19 is produced by means of an additive production process, e.g. (laser) sintering, i.e. it is built up in layers, in particular from a highly thermal resistant material. As a result of this production process, the pre-chamber 17 is entirely encapsulated in the pre-chamber element 19, and it is also possible to produce complex geometries in conjunction with the pre-chamber 17, e.g. a bulging or widening in regions away from the nozzle, or a star-shaped cross section in the pre-chamber element 19 without difficulty. There is also the advantage of being able to integrally form the pre-chamber element 19 such that it can be easily manipulated.

In order to carry out the combustion process intended with the fuel injector 1—a pre-chamber ignition (of the low pressurized combustion gas) and the subsequent ignition of the discharged (highly pressurized combustion gas) in a main combustion chamber by means of the sparks from the pre-chamber ignition—the pre-chamber 17 is a flushed chamber 17 in the embodiment shown in FIG. 1, on which the assembly has both a low pressure dosing device 31, or reservoir 29 for combustion gas (for flushing the pre-chamber) as well as an ignition device 31 at the end away from the nozzle. For this, the pre-chamber element 19 has through holes 33a, b, in order to bring the low pressure feed device 29 and the ignition device 31 into communication with the pre-chamber 17 in a suitable manner, including enabling the functionality thereof for the dosing or ignition in the pre-chamber 17. Installation spaces 35a, b for the low pressure dosing device 29, or the ignition device 31 can also be provided (on the end) on the adjacent injector housing 23.

A spark plug can serve as the ignition device 31, and a low pressure gas dosing valve can serve as the dosing device 29 for flushing the pre-chamber 17. A low pressure combustion gas supply line 37 is connected to the low pressure gas dosing valve in the fuel injector. It can be supplied via an external source and/or—advantageously easily, in particular with regard to a significant associated unnecessary leakage treatment—take place from low pressure combustion gas leakage from the high pressure injector part 3 inside the injector.

The pre-chamber assembly 39, formed with the pre-chamber element 19, is also designed such that the high pressure chamber 11 is separated circumferentially from the pre-chamber 17 via a nozzle-side end section (the high pressure chamber 11), cf. FIG. 1. In this regard, the pre-chamber 17 is formed around the high pressure chamber 11 on the fuel injector 1, and the pre-chamber 17 is also near the nozzle assembly 5 of the high pressure injector part 3, or the nozzle-side end of the pre-chamber element 19. This also results in the further advantage that the overflow openings 41 for the pre-chamber 17, which are likewise formed on the nozzle-side end of the pre-chamber 17 in the pre-chamber element 19, also enable sparks (pilot ignition) to enter the combustion chamber directly (in FIG. 1, the separating plane A of the combustion chamber cylinder head is indicated by a broken line).

The overflow openings 41 can also be advantageously located around the combustion gas nozzle assembly 5 in the proposed fuel injector 1 in which the pre-chamber 17 has an annular cross section in this regard (at the nozzle-side end section), such that an advantageous 360° coverage of the spark output into the combustion chamber can be obtained, resulting in an advantageously uniform combustion. It should also be noted that an extremely compact structure is also obtained therewith.

In the fuel injector 1 according to FIG. 1, the pre-chamber assembly 39, or the fuel injector 1, has a separating wall assembly 43 for separating the pre-chamber 17 form the high pressure chamber 3, which is formed as a simple, in particular tube-shaped separating wall, formed as an integral part of the pre-chamber element 19, wherein the separating wall also forms the wall for the high pressure chamber 3 via the end section thereof in this regard. In the embodiment shown here, as is also the case in the other embodiments of the fuel injector explained below, the pre-chamber 17 extends substantially the same axial length as the pre-chamber element 19, in particular including the high pressure chamber 3 and the end section of the nozzle valve element 7.

Figure 2:
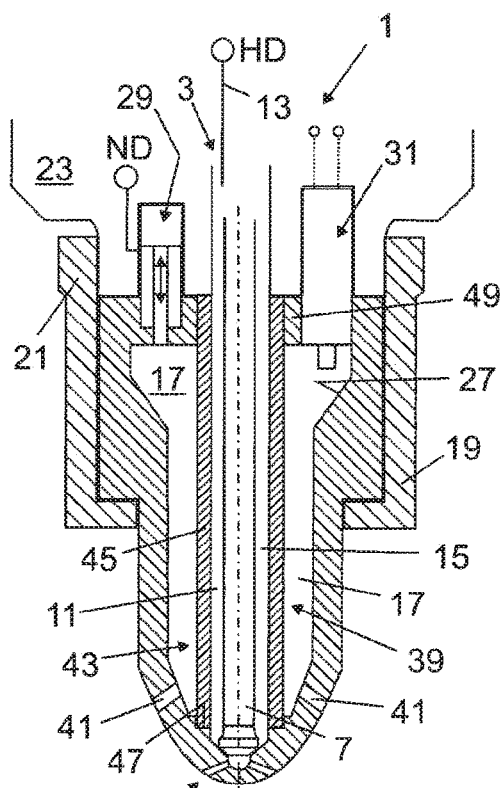
FIG. 2 shows a fuel injector, by way of example and schematically, in a broken down and simplified sectional view according to another possible embodiment.

FIG. 2 shows a view of a fuel injector 1 according to another possible embodiment of the, wherein, in differing form the embodiment described above, the pre-chamber assembly 39 is formed with a pre-chamber element 19 in which a separately formed separating wall assembly 43 is located to divide or separate the high pressure chamber 11 encompassing the end section of the nozzle valve element 7 from the pre-chamber 17 encompassing the end section of the high pressure chamber 11.

In the embodiment shown in FIG. 2, the separating wall assembly 43 is formed by means of a separating wall in the form of a simple sleeve, or sleeve element 45, which is in the form of a tube segment in particular. For an accurately positioned accommodation and securing, the sleeve element 45 is fixed in an annular step 47 on the pre-chamber element 19 at the nozzle end in a form fitting manner, and on an end away from the nozzle, it is secured on a positioning collar 49 interacting with the end surface of the injector housing 23. Such an embodiment has the advantage in particular that the access to the needle seat 9 remains unobstructed as long as the sleeve element 45 has not yet been placed in the pre-chamber element 19, such that the seat 9 can be finished easily.

In the embodiment shown in FIG. 2, an additive finishing process is used for producing the pre-chamber element 19, such that the exemplary illustrated shape of the pre-chamber element 19, which contains undercuts in the form of positioning collars 49 on the end surface away from the nozzle, can also be produced without difficulty.

Figure 3:
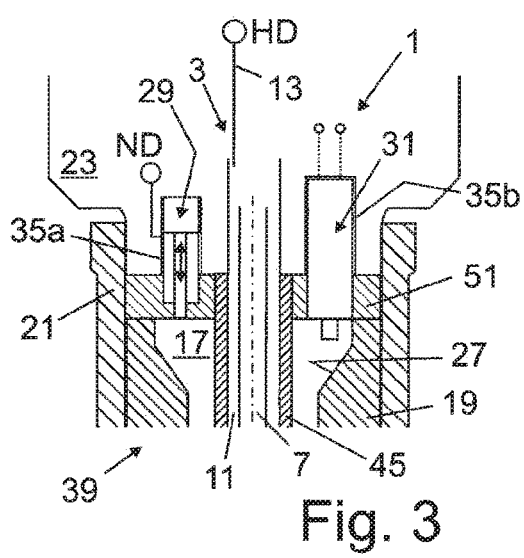
FIG. 3 shows a fuel injector, by way of example and schematically, in a broken down and simplified sectional view analogous to FIG. 2 according to another possible embodiment.
Figure 4:
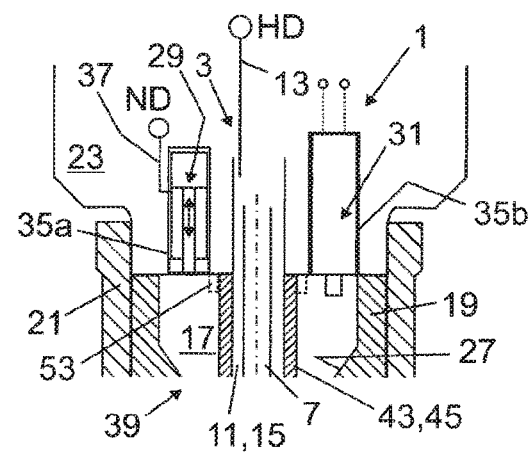
FIG. 4 shows a fuel injector, by way of example and schematically, in a broken down and simplified sectional view analogous to FIGS. 2 and 3 according to yet another possible embodiment.

FIGS. 3 and 4 show possible variations of the fuel injector 1 according to FIG. 2.

In the embodiment illustrated in FIG. 3, the pre-chamber element 19 has no undercuts, in differing from the fuel injector 1 shown in FIG. 2, for which reason the pre-chamber element has no positioning collar 49 on the end away from the nozzle. The pre-chamber element 19 can thus also be easily produced without an additive process, in particular in the manner of a conventional nozzle element. An intermediate washer 51 can be used to cap and position the sleeve element 45 on the end surface away from the nozzle, which supports (and seals) it radially, while the clamping of the sleeve element 45 for an accurately positioned securing thereof takes place with the injector housing 23, i.e. in the framework of tensioning the assembly comprising the pre-chamber element 19, intermediate washer 51, and the injector housing 23 by means of a tensioning nut 21.

Alternatively, FIG. 4 shows an embodiment of the fuel injector 1 in which the pre-chamber element 19 is analogous to the embodiment shown in FIG. 3, wherein, however, there is no intermediate washer 51 for positioning the sleeve element or capping the pre-chamber element 19.

In the embodiment shown in FIG. 4, the injector housing 23 caps the pre-chamber element 19 at its open end (away from the nozzle) directly with its nozzle-side end surface, wherein the ignition device 31 and the combustion gas low pressure valve 29 then take up installation space 35a, b in the injector housing 23. A clamping of the sleeve element 45 also takes place directly here, via the injector housing 23, adjacent to which an annular collar 43 or annular groove can be provided on its end surface, for example, in order to enable a radial support of the sleeve element for improving the accuracy of the positioning (an annular collar 53 is indicated by way of example with a broken line).

Figure 5:
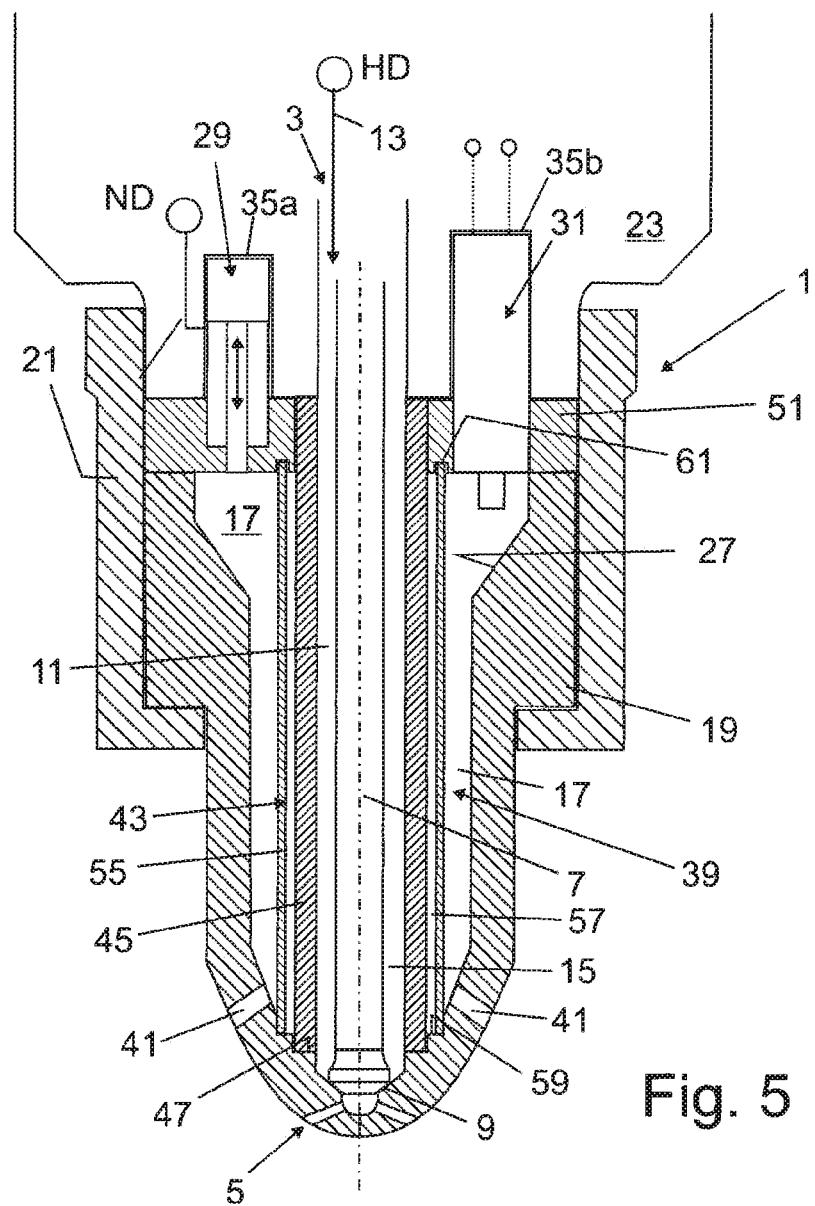
FIG. 5 shows a fuel injector, by way of example and schematically, in a broken down and simplified sectional view according to yet another possible embodiment.

FIG. 5 shows another advantageous exemplary embodiment of the fuel injector 1, which is similar to the embodiment shown in FIG. 2 with regard to the pre-chamber element 19 and the capping thereof. In differing from the embodiments of the fuel injector 1 described above in reference to FIGS. 1 and 4, the fuel injector 1 shown in FIG. 5 has a separating wall assembly 43 that contains multiple walls.

With this separating wall assembly 43, which in the present example contains two separating wall elements 45, 55, there is a sleeve element 45, in particular an inner or first sleeve element 45, analogous to the embodiments shown in FIGS. 2 to 4, which is sufficiently pressure-tight that the pressure-tight division of the high pressure chamber 3 from the outer encircling pre-chamber 17 is reliably obtained, while the second sleeve element 55 functions as a heat shield element. For this, the second sleeve element 55 encircles the inner sleeve element 45 in the pre-chamber element 19, forming an annular gap 57 therebetween, wherein the annular gap 57 basically forms an insulating gap, or it can form, e.g., a cooling channel (e.g. through which a coolant can flow).

With this pre-chamber assembly 39, the pre-chamber 17 is formed on the outside of the sleeve element 55, e.g. such that it encompasses it. The heat shield element in the form of the second separating wall or sleeve element 55, is made of a thin sheet metal and accurately positioned at the nozzle end—as with the first sleeve element 45—in an annular step 59 provided for this on the pre-chamber element 19, and retained at the end away from the nozzle in an annular groove 61, for example, formed in this embodiment in an intermediate washer 51, by way of example (alternatively, e.g., directly on the injector housing 23, as in FIG. 4).

An improved heat shield effect for the high pressure chamber 3 is obtained with this double-walled separating wall 45, 55, such that the load to the components can be significantly reduced there. This is achieved in that the heat transfer through the sparks in the pre-chamber 17, or the combustion therein, is advantageously reduced by means of the heat shield element 55.

Lastly, it should be noted that highly pressurized combustion gas intended in the framework of operating an internal combustion engine with the fuel injector, or for discharging it therewith, is preferably compressed (gaseous) natural gas (CNG: compressed natural gas). Furthermore, for a low pressure intake in the pre-chamber 17, e.g., liquid combustion gas from a liquid store can be vaporized (as is often the case with water vehicles). The liquid combustion gas can be liquid natural gas (LNG: liquefied natural gas) in particular in this case.

LIST OF REFERENCE SYMBOLS 1 fuel injector
3 high pressure injector part
5 nozzle assembly
7 nozzle valve element
9 seat
11 high pressure chamber
13 high pressure channel
15 annular gap
17 pre-chamber
19 pre-chamber element
21 tensioning nut
23 injector housing
25a, b centering cone
27 bulge/widening
29 low pressure intake device
31 ignition device
33a, b through hole
35a, b installation space
37 low pressure combustion gas supply line
39 pre-chamber assembly
41 overflow opening
42 separating wall assembly
45 sleeve element
47 annular step
49 positioning collar
51 intermediate washer
53 annular collar
55 separating wall element
57 annular gap
59 annular step
61 annular groove
A separating plane

The invention claimed is:

1. A fuel injector, comprising:
an internal pre-chamber; and
a high pressure injector part for discharging combustion gas, comprising a nozzle assembly at a nozzle-side end section and a stroke-displaceable nozzle valve element, which is arranged within the nozzle-side end section and configured to selectively open or close a flow path from the high pressure chamber of the high pressure injector part to the nozzle assembly at the nozzle-side end section;
a pre-chamber assembly;
wherein the high pressure chamber of the high pressure injector part is separated circumferentially from the pre-chamber by the nozzle-side end section.

2. The fuel injector according to claim 1, wherein the pre-chamber assembly comprises one or both of:

at least one sleeve-shaped element for separating the nozzle-side end section of the high pressure chamber from the pre-chamber encircling it; and the pre-chamber assembly has a multi-walled separating wall for separating the nozzle-side end section of the high pressure chamber from the pre-chamber encircling it.

3. The fuel injector of claim 1, further comprising a heat shield configured to separate the nozzle-side end section of the high pressure chamber from the pre-chamber encircling it.

4. The fuel injector of claim 1, wherein the pre-chamber assembly comprises a pre-chamber element, inside which the end section of the high pressure chamber is also separated circumferentially from the pre-chamber.

5. The fuel injector of claim 4, wherein the pre-chamber element has an integrally formed separating wall, wherein the end section of the high pressure chamber is separated circumferentially from the pre-chamber.

6. The fuel injector of claim 4, wherein:
the pre-chamber element forms a seat for the nozzle valve element; or
the nozzle assembly of the high pressure injector part is arranged within the pre-chamber element; or
the pre-chamber element defines an overflow opening for the pre-chamber.

7. The fuel injector of claim 4, wherein the pre-chamber element is produced by means of an additive production process.

8. The fuel injector of claim 1, wherein the pre-chamber has an annular cross section.

9. The fuel injector of claim 1, wherein the fuel injector has at least one of an ignition device and a low pressure combustion gas feed device on the pre-chamber.

10. The fuel injector of claim 1, wherein the fuel injector is configured to supply the pre-chamber with combustion gas occurring in the form of leakage gas at the high pressure injector part.

11. An internal combustion engine, comprising at least one fuel injector comprising:
an internal pre-chamber; and
a high pressure injector part for discharging combustion gas, comprising a nozzle assembly at a nozzle-side end section and a stroke-displaceable nozzle valve element, which is arranged within the nozzle-side end section and configured to selectively open or close a flow path from the high pressure chamber of the high pressure injector part to the nozzle assembly at the nozzle-side end section;
a pre-chamber assembly;
wherein the high pressure chamber of the high pressure injector part is separated circumferentially from the pre-chamber by the nozzle-side end section.

12. The internal combustion ending of claim 11, wherein the pre-chamber assembly comprises one or both of:
at least one sleeve-shaped element for separating the nozzle-side end section of the high pressure chamber from the pre-chamber encircling it; and
the pre-chamber assembly has a multi-walled separating wall for separating the nozzle-side end section of the high pressure chamber from the pre-chamber encircling it.

13. The internal combustion engine of claim 11, further comprising a heat shield configured to separate the nozzle-side end section of the high pressure chamber from the pre-chamber encircling it.

14. The internal combustion engine of claim 11, wherein the pre-chamber assembly comprises a pre-chamber element, inside which the end section of the high pressure chamber is also separated circumferentially from the pre-chamber.

15. The internal combustion engine of claim 14, wherein:
the pre-chamber element forms a seat for the nozzle valve element; or
the nozzle assembly of the high pressure injector part is arranged within the pre-chamber element; or
the pre-chamber element defines an overflow opening for the pre-chamber.

16. The internal combustion engine of claim 14, wherein the pre-chamber element has an integrally formed separating wall, wherein the end section of the high pressure chamber is separated circumferentially from the pre-chamber.

17. The internal combustion engine of claim 14, wherein the pre-chamber element is produced by means of an additive production process.

18. The internal combustion engine of claim 11, wherein the pre-chamber has an annular cross section.

19. The internal combustion engine of claim 11, wherein the fuel injector has at least one of an ignition device and a low pressure combustion gas feed device on the pre-chamber.

20. The internal combustion engine of claim 11, wherein the fuel injector is configured to supply the pre-chamber with combustion gas occurring in the form of leakage gas at the high pressure injector part.

* * * * *